United States Patent

Giltzow

[15] 3,690,014
[45] Sept. 12, 1972

[54] TRANSPARENT GRID FOR COMPASS

[72] Inventor: James Hunter Giltzow, Roseland, N.J.

[73] Assignee: Aqua Meter Instrument Corporation, Roseland, N.J.

[22] Filed: March 18, 1970

[21] Appl. No.: 20,595

[52] U.S. Cl. ................................. 33/346, 33/72 R
[51] Int. Cl. ........................ G01c 17/08, G01c 17/20
[58] Field of Search ........ 33/223, 224, 225 R, 72 R, 222 R, 33/222 A

[56] References Cited

UNITED STATES PATENTS

| 3,069,783 | 12/1962 | Dinsmore | 33/223 X |
| 163,837 | 6/1875 | Baker | 33/223 |
| 3,481,045 | 12/1969 | White | 33/223 |
| 918,709 | 4/1909 | Smith | 33/224 |
| 1,332,027 | 2/1920 | Bunker | 33/223 |
| 2,178,623 | 11/1939 | Carter | 33/204 |

FOREIGN PATENTS OR APPLICATIONS

| 487,757 | 6/1938 | Great Britain | 33/223 |
| 507,889 | 6/1939 | Great Britain | 33/223 |
| 2,392 | 6/1880 | Great Britain | 33/223 |

OTHER PUBLICATIONS

Catalog No. M13 Goldbergs', 202 Market St., Phila. Pa. 19106 Copyrighted 1969. pages 8, 9, and backcover relied on.

Primary Examiner—Robert B. Hull
Attorney—Darby and Darby

[57] ABSTRACT

A generally spherical compass for mounting on a boat has a transparent grid which is superimposed over a compass card with navigational markings. The grid has radial arms extending from a central hub to the outer rim of the grid upon which a heading line, a reciprocal line and two bearing lines are inscribed. Each bearing line is offset 45° from a side of the course line, which is aligned with the longitudinal axis of the boat, in order that the boat may be navigated from either side of the helm. In an alternate embodiment, a transparent disc with a heading line, a reciprocal line and offset bearing lines inscribed on it is superimposed over the compass card. The transparent disc is supported over the compass card by a set of pins whose vertical axis is substantially offset form corresponding holes positioned about the periphery of the disc. An apparent disappearance of the transparent members, leaving only the lines visible, results from the damping fluid having approximately the same index of refraction as the transparent members.

21 Claims, 7 Drawing Figures

PATENTED SEP 12 1972 3,690,014

INVENTOR
JAMES HUNTER GILTZOW

BY *Darby & Darby*

ATTORNEYS

PATENTED SEP 12 1972

INVENTOR.
JAMES HUNTER GILTZOW

BY Darby & Darby

ATTORNEYS

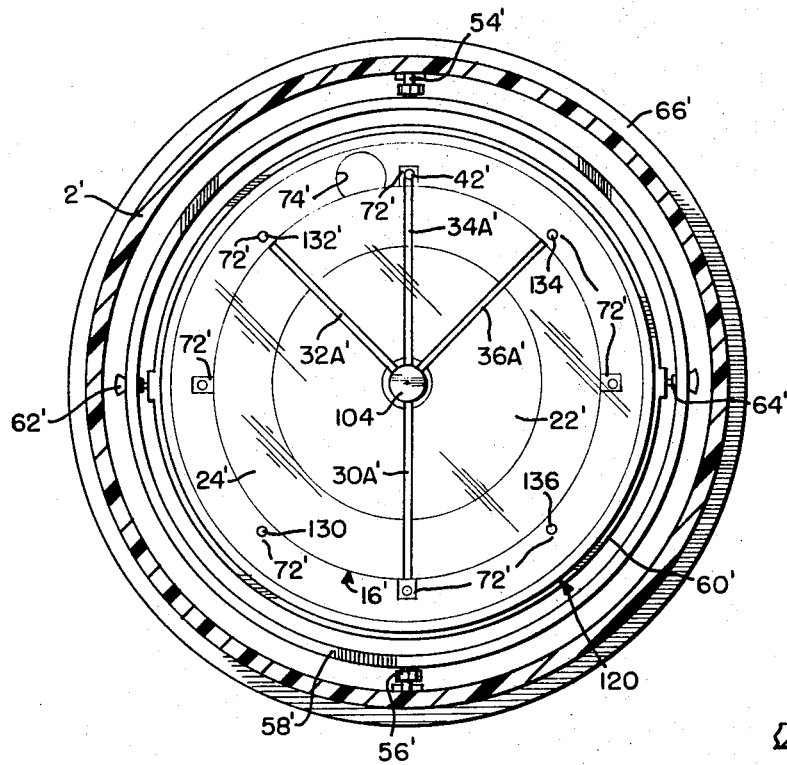
FIG. 5
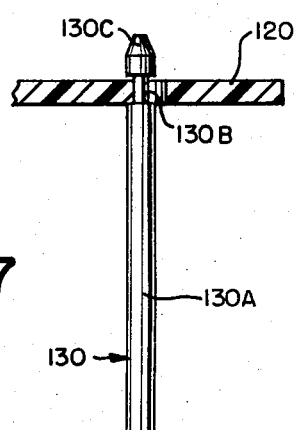
FIG. 7
FIG. 6
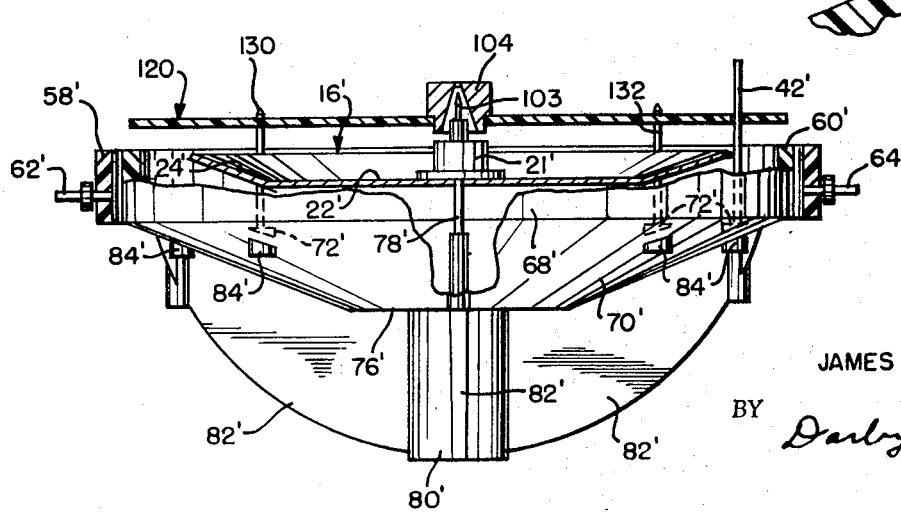
INVENTOR.
JAMES HUNTER GILTZOW
BY Darby & Darby
ATTORNEYS 3,690,014

TRANSPARENT GRID FOR COMPASS

It is conventional in the magnetic compass art to have a vertical course line commonly referred to as a lubber line inscribed or mounted on an adjacent surface. When the compass is mounted on a boat (or other water craft), it is positioned so that the course line is aligned with the boat's longitudinal axis. This is, of course, necessary in order for the helmsman to determine the boat's exact bearing. However, a major problem encountered when using this conventional compass is the helmsman's inability to accurately determine the boat's bearing from any position other than one directly in line with the course line. This is due to the parallax phenomenon which causes the course line to appear to be indicating a bearing other than the true bearing when the course line is sighted from an angle other than zero degrees. This problem is particularly acute when the conventional compass is mounted on sailboats which heel at a severe angle as they sail through the water. The usual position for the helmsman of a sailboat is on that side of the helm opposite the side which is heeled toward the water. In such position it is difficult for the helmsman to accurately determine the boat's bearing using this conventional compass because of the parallax phenomenon.

It is therefore an object of this invention to provide a spherical compass for mounting on a boat which enables the boat's bearing to be accurately determined from a position on either side of the boat.

It is another object of this invention to provide a spherical compass having a circular, transparent grid with radial arms extending from a central hub upon which bearing lines and a course line are inscribed.

It is a further object of this invention to provide a rigid lubber line element which extends perpendicular through the transparent grid.

It is a further object of this invention to provide a molded grid in a spherical compass which cooperates with the compass card above which the grid is mounted to urge the card to more quickly return to a substantially horizontal position after its position has been disturbed by the movement of the boat.

This invention provides a circular transparent grid with radial arms extending inwardly upon which bearing lines and a course line are inscribed. The grid arrangement is superimposed over a compass card which is attached to a gimbaled assembly. The grid arrangement includes a central hub supported by the radial arms. A course line is inscribed on one of the radial arms extending from the hub. Bearing lines are inscribed on radially extending arms that are offset a predetermined number of degrees to each side of the course line radial arm. The off-set bearing lines permit the compass of this invention to be more readable from either side than conventional compasses with only a simple course line. When the spherical compass is filled with compass oil, the molded grid arrangement effectively disappears so that the inscribed lines on the grid appear to be suspended over the compass card.

Since the inscribed lines on the grid are parallel and close to the surface of the compass card and not perpendicular to the card, as are the vertically extending lubber lines on conventional spherical compasses, it is possible to read the compass card accurately from many angles of view not possible with prior compasses. However, the compass of this invention also permits inclusion of a traditional lubber line (extending vertically from near the edge of the compass card through the transparent grid).

In using a compass according to the invention the helmsman on a sailboat can position himself on either side of the helm and be directly aligned with one of the bearing lines. In the specific case illustrated, where the bearing lines are offset 45° from the course line, a helmsman positioned on the starboard side of the boat, for example, determines the boat's course by adding 45° to the number of the degrees indicated by the bearing line with which he is aligned, thereby permitting the helmsman to steer the boat from approximately forty-five degrees to either side of the helm.

On power boats with flying bridges there is often a window on the flying bridge through which the captain can look below at the boat's instruments. With the grid arrangement of this invention the compass can be accurately read from directly overhead as well as at the more conventional angles.

A domed hub with a central cavity is formed at the center of the transparent grid. The central cavity engages a pin emanating from the center of the compass card in order that the rocking motion of the compass card is restrained.

Another feature of this invention is the relative ease with which the transparent grid is assembled into the spherical compass by snapping the grid into place.

In an alternate embodiment of this invention the grid is replaced by a transparent disc with a course line, a reciprocal line, and offset bearing lines inscribed on it. The disc is suspended over the compass card by pins extending vertically from the gimbal assembly. The supporting pins engage respective holes around the outer periphery of the disc.

These and other objects and features of this invention will be more readily understood and appreciated from the following description and accompanying drawings, of which:

FIG. 5 is a cross-sectional view of an alternate embodiment of this invention taken along an equatorial plane of the compass sphere;

FIG. 6 is a side elevational view of the gimbal assembly of the compass illustrated in FIG. 5 with parts broken away; and FIG. 7 is an enlarged side-elevational view of the support mechanism of the alternate embodiment of this invention.

Figure 1:
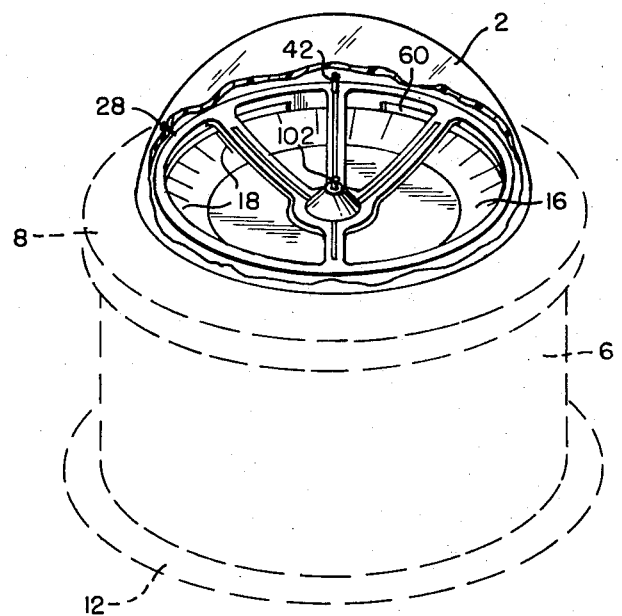
FIG. 1 is an over-all view in perspective of the spherical compass of this invention in an external binnacle case.

Referring now to FIG. 1, the preferred embodiment of the spherical compass assembly of this invention includes a transparent hemispherical dome 2 which is secured to a body member 6 by an annular flange 8 which fits snugly around the hemispherical dome. The flange 8 may be joined to the body member by any suitable means such as, for example, by a number of screws which may be set around the periphery of the flange and threaded into the body member. Alternately, the annular flange 8 may be molded integrally with body member 6.

The lower flange 12 is integral with the body member 6 and may be used to secure the spherical compass assembly in a binnacle or other desired location on a boat. When securing the compass assembly in the boat, it is, of course, necessary to align the course line on the transparent grid 28 with the longitudinal axis of the boat so that the boat's bearing can be accurately determined.

A circular compass card 16 having markings 18 indicating the number of degrees is supported at its center so that it is free to rotate and (within limits) to tilt. The compass card 16 is saucer-like in shape, having a flat central portion 22 and a peripheral portion 24 that is inclined at a slight angle. The compass card degree markings 18 are inscribed on the raised periphery 24 of the compass card, thereby facilitating their reading. Directional markings such as north, south, east and west may be designated on the flat portion 22 of the compass card directly adjacent the raised peripheral portion 24.

A circular grid 28 with transparent radial arms 30, 32, 34 and 36 extending outwardly from a domed hub 4 to the outer rim 20 of the grid is supported above the compass card 16. A course line 34A is inscribed on radial arm 34. Similarly, bearing lines 32A and 36A are inscribed on radial arms 32 and 36, respectively, which are each offset 45° from radial arm 34. Also, reciprocal line 30A is inscribed on radial arm 30, which is disposed 180° from radial arm 34.

A lubber line 42 extends perpendicularly through a hole in radial arm 34 so that it intersects course line 34A. By aligning the horizontally extending course line 34A with the vertically extending lubber line 42 when sighting the boat's bearing, the parallax phenomenon is avoided because the two lines form the proper reference plane for a true reading. The parallax phenomenon can also be avoided by aligning the course line 34A or the bearing lines 32A and 36A with the degree markings 18 on the compass card. The degree markings 18 could be extended to the center of the compass card to facilitate this alignment.

Figure 2:
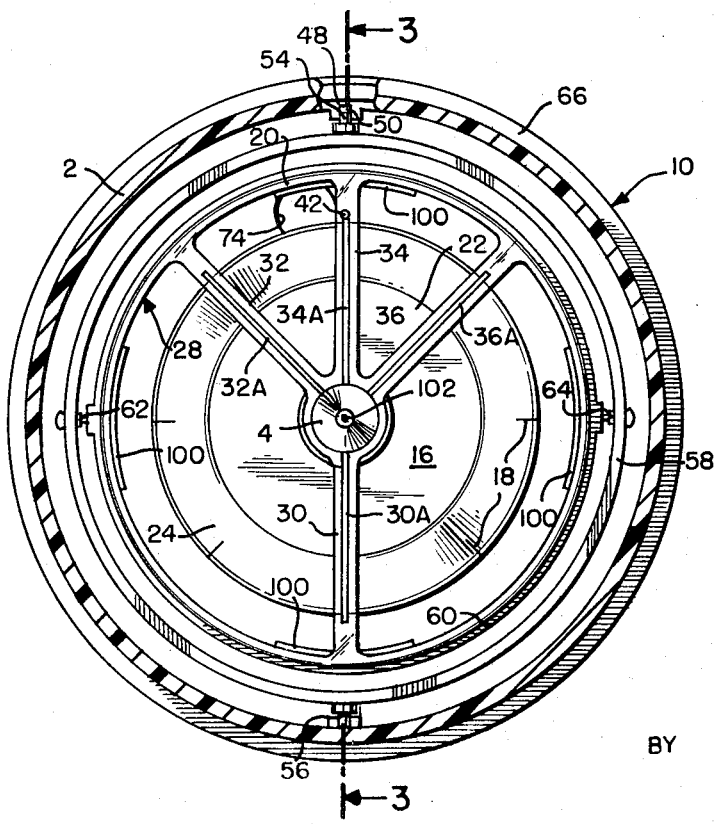
FIG. 2 is a cross-sectional view taken along an equatorial plane of the compass sphere.
Figure 3:
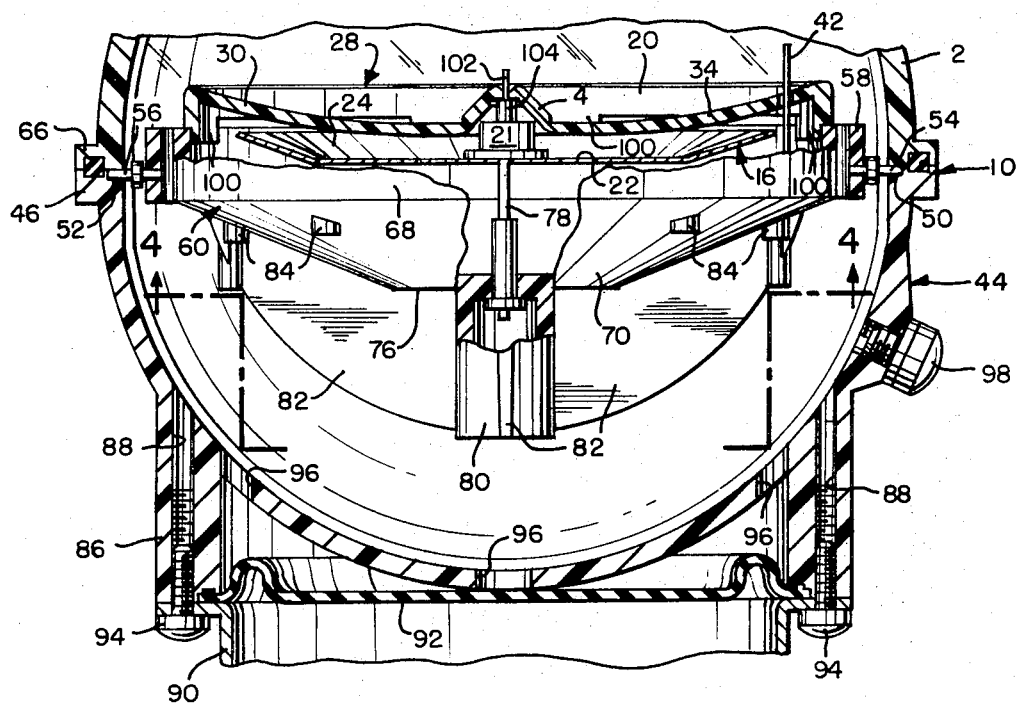
FIG. 3 is a cross-sectional view of the compass illustrated in FIG. 2 taken along the line 3—3.

Referring now to FIG. 2, the spherical compass assembly 10 (the major portion of which is illustrated in FIG. 3) is formed by a lower hemispherical body 44 having an outer flange 46 which engages the upper transparent hemispherical dome 2. The junction of the outer flange 46 with the hemispherical dome 2 forms a leak-tight seal for damping liquid (not shown) which is provided within the spherical compass assembly 10. Directly adjacent the lower hemispherical body outer flange 46 is a rim 48 with two grooved notches 50 and 52 which are spaced 180° apart for rotatably supporting pins 54 and 56, respectively, which are rigidly attached to a gimbal ring 58 and which extend perpendicularly from the circumferential surface of the ring. The equilibrium position of the gimbal ring 58 is a horizontal plane. The gimbal ring 58 is free to rotate about the notch axis of the rim 48 when the motion of the boat on which the compass is mounted deviates from the vertical so that the gimbal ring remains horizontal.

The gimbal cup 60 is rotatably supported on the gimbal ring 58 by pins 62 and 64 which are attached to the gimbal or gimbaled cup and which extend perpendicularly from its outer circumferential surface. The pins 62 and 64 are positioned 90° from the pins 54 and 56 supporting the gimbal ring 58 on the lower hemispherical body 44, thereby providing a cardanic suspension for the gimbal cup 60 which allows it to rotate freely with respect to the axes formed by the pins 54 and 56 and by the pins 62 and 64. A cardanic suspension is, of course, necessary because the compass card 16 and transparent grid 28 are both supported by the gimbal cup 60 and they must both be in a horizontal plane regardless of the motion of the boat for proper operation.

FIG. 2 further illustrates the transparent grid 28 having radial arms 30, 32, 34, and 36 extending radially from domed hub 4 to the outer rim 20 of the grid. As previously mentioned, course line 34A, reciprocal line 30A, and bearing lines 32A and 36A are inscribed on these radial arms. When the compass assembly is filled with damping fluid, the transparent grid 28 effectively disappears and the inscribed lines on the radial arms appear to be suspended above the compass card. The apparent disappearance of the grid results from the damping fluid and the transparent disc having the same index of refraction.

Referring now to FIG. 3, the spherical compass assembly 10 is formed by the upper transparent hemispherical dome 2 which has a grooved outer flange 66 which engages the grooved outer flange 46 of the lower hemispherical body 44 to form a fluid-tight seal for the damping liquid within the spherical compass assembly. This damping fluid can be any suitable mixture having approximately the same index of refraction as the transparent grid. The damping fluid provides an inertial force which lessens the oscillations of the independently suspended bodies within the spherical compass assembly (for example, the gimbal ring, the gimbal cup, and the compass card).

A suitable packing material may be placed in the groove formed by the engagement of the outer flanges 44 and 66 of the upper hemispherical dome 2 and the lower hemispherical body 44, respectively.

As previously mentioned, the gimbal cup 60 is rotatably supported in the gimbal ring 58 which is supported in the spherical compass assembly 10 by pins 54 and 56. The gimbal cup 60 includes three main sections. The first section of the gimbal cup is the ring-shaped section 68 which normally lies in the same plane as the gimbal ring 58 and which is concentric with it. The pins 54 and 56 extend perpendicularly from the outer circumferential surface of the ring section 68. The second section of the gimbal cup 60 is the frustoconical section 70 which is directly adjacent the ring section 68 and which has a series of reliefs (not shown) circularly arranged on its inner surface. The reliefs (not shown) extend through the bottom surface of the gimbal cup's frustoconical section and form cylindrical protuberances 84. One of the reliefs supports the lubber line 42 which extends perpendicularly from the frustoconical section 70 through a hole in the transparent grid radial arm 34. The support provided to the lubber line 42 by one of the reliefs ensures that it is not bent from its perpendicular position and hence that it always indicates the boat's true bearing. Further lubber lines may be inserted into others of the reliefs as a navigational aid.

A circular hole 74 (shown in FIG. 4) in the frustoconical section 70 of the gimbal cup permits the passage of damping fluid from beneath the gimbal cup 60 to the compass card 16.

Figure 4:
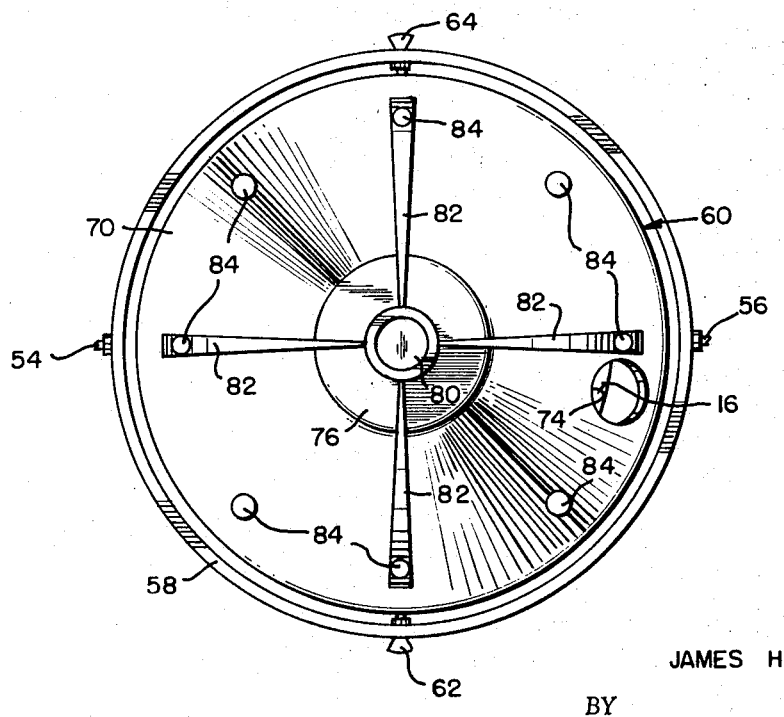
FIG. 4 is a cross-sectional view of the spherical compass in FIG. 3 taken along the line 4—4.

The third section of the gimbal cup is a flat circular section 76 (the bottom surface of which is shown in FIG. 4) which directly adjoins the gimbal cup's frustoconical section 70. A shaft 78 upon which the compass card 16 is supported is attached to the gimbal cup's flat circular section 76. The shaft 78 extends perpendicularly from the surface of the gimbal cup's circular section into a jewel bearing within central hub 21 which is attached to the compass card 16. The engagement of the shaft 78 with the jewel bearing in the central hub 21 permits the compass card to rotate and tilt freely in response to magnetic field induced forces. Usually the compass magnet takes the form of a pair of permanent magnets (not shown) which are fastened to the underside of the compass card by a bracket with depending stirrups.

Depending perpendicularly from the underside of the gimbal cup's flat circular section 76 is a hollow circular cylinder 80 (also illustrated in FIG. 4) into which weights may be placed to further stabilize the gimbal cup.

Referring now to FIGS. 3 and 4, four vanes 82 extend from the underside of the gimbal cup's frustoconical section 70 to the hollow circular cylinder 80 in the approximate shape of solid circular quadrants. These vanes are, of course, immersed in the damping fluid and aid in stabilizing the gimbal cup. The position of vanes 82 with respect to the gimbal cup is best illustrated in FIG. 4. A variety of other configurations of the vanes 82 is, of course, possible.

Referring again to FIG. 3, an annular skirt 86 is formed at the base of the lower hemispherical body 44. Directly adjacent the skirt 86 are a series of threaded openings 88 which are within a series of vertically extending cylindrical pilasters spaced around the skirt. The frame 90 on which a diaphragm 92 is supported is mounted on the lower hemispherical body 44 by a series of screws 94 which are threaded into the openings 88 in the lower hemispherical body. The frame 90 and diaphragm 92 form an expensive chamber which changes in volume as the damping liquid contracts or expands in response to changes in temperature. The bottom surface of the annular skirt 86 is grooved so that a tongue on the diaphragm 92 fits snugly within the groove. The tongue and groove arrangement provide a fluid-tight seal which prevent the damping fluid from leaking out from the spherical compass assembly.

Three holes 96 in the base of the lower hemispherical body 44 permit the damping fluid to be in communication with the diaphragm 92. A drain plug 98 for the damping fluid is threaded into the wall of the lower hemispherical body 44.

The transparent grid 28 is supported on the gimbal ring 60 by shoulders 100 depending from the transparent grid's outer rim 20. The transparent grid's depending shoulders 100 are equidistantly spaced about the grid's outer rim and formed so that the grid may be easily snapped into place in the gimbal ring. As illustrated in FIG. 3, the grid's radial arms 30 and 34 are sloped downwardly from the grid's outer rim 20 to the grid's domed hub 4. Although not illustrated in FIG. 3, the grid's radial arms 32 and 36 are similarly downwardly sloped. The downwardly curved shaping of the grid's radial arms tends to follow the contour of the saucer shaped compass card 16. This arrangement minimizes the distance between the lines inscribed on the grid's radial arms and the markings on the compass card, thereby enhancing the clarity of the compass readings. Course line 34A, reciprocal line 30A, and bearing lines 32A and 36A are all inscribed in a groove on the underside of their respective radial arms in order to assure the depth and sharpness of the lines.

The central hub 21 which supports the compass card on shaft 78 has a pin 102 extending vertically from a cylindrical member 104 on the hub's top surface. The pin 102 extends through a central cavity in the grid's domed hub 4. Since the compass card 16 is mounted on a jewel bearing within the central hub 21, it is free to rotate and tilt. However, tilting of the compass card 16 causes the central hub's pin 102 to strike the sides of the hole in the grid's domed hub 4 through which the pin extends. The contact of the pin with the sides of the hole limits the extent of tilt of the compass card so that it quickly returns to its horizontal equilibrium position after it has been disturbed from this position by the motion of the boat or by some other disturbance.

In an alternate embodiment of this invention, illustrated in FIGS. 5, 6 and 7, a transparent disc 120 has a course line 34A', a reciprocal line 30A', and bearing lines 32A' and 36A' inscribed on its underside. This is best illustrated in FIG. 5. Whereas the preferred embodiment of this invention has a molded grid with curved radial arms extending downwardly from the outer rim of the grid to a domed hub, the alternate embodiment of this invention has a flat, transparent disc. With the exception of the features of the alternate embodiment of this invention described here, the primed numerals in FIGS. 5, 6, and 7 represent corresponding features of the preferred embodiment of the invention described in FIGS. 1, 2, 3, and 4. Accordingly, those features of the alternate embodiment of the invention designated by primed numerals respond to the same description as, and are the same as, those features in the preferred embodiment designated by corresponding numerals. As in the other embodiment described above, the gimbal assembly is immersed in damping liquid (not shown).

The flat, circular transparent disc 120 is supported substantially parallel to the flat central portion of the compass card 16' by supporting pins 130, 132, 134 and 136. A series of small holes around the outer periphery of the transparent disc 120 are each engaged by one of the supporting pins, as will be described in more detail below in connection with FIG. 7. A cylindrical hub 104 is centrally attached to the transparent disc with some clearance for tilt of the card 16'.

As in the preferred embodiment, bearing lines 32A' and 36A' are each offset 45° from the course line 34A' and the reciprocal line 30A' is disposed 180° from the course line. Thus, the compass of FIG. 7 is accurately readable from a much greater variety of angles than is possible with any conventional compass.

Referring now to FIG. 6, a lubber line 42' extends perpendicularly through a hole in the outer periphery of the transparent disc 120. A series of reliefs 72' are circularly arranged on the inner surface of the gimbal cup's frustoconical section 70'. The series of reliefs 72' provide support for the pins 130, 132, 134, and 136 and for the lubber line 42'. The supporting pins extend from the gimbal cup's frustoconical section 70' to support the transparent disc 120. The number of reliefs 72' on the surface of the gimbal cup's frustoconical section is not critical but there must be as many reliefs as there are pins supporting the transparent disc and lubber lines extending through the transparent disc. Regardless of the number of reliefs 72', however, the diameter of their circular arrangement must be greater than the diameter of the compass card 16' so that the card can rotate freely, without its outer edge brushing against the supporting pins and the lubber line. It is desirable that the reliefs 72' be deep in order to properly support pins 130, 132, 134, and 136, which are extremely narrow and lightweight and are subject to a certain amount of tension when the transparent disc 120 is placed over them.

Referring now to FIG. 7, since supporting pins 130, 132, 134, and 136 are identical, only pin 130 will be referred to in the following description. The supporting pin 130 can be divided into three sections, which are the main section 130A, the neck section 130B, and the head section 130C. The pin's main section 130A is firmly embedded in one of the reliefs 72' in the gimbal cup's frustoconical section. The pin's main section is of constant diameter and extends vertically from the relief support to the neck section 130B, which is smaller in diameter than the pin's main section. The pin's neck section 130B extends vertically a distance somewhat greater than the thickness of the transparent disc 120 to the pin's head section 130C. A shoulder for supporting the transparent disc is formed at the junction of the pin's main section 130A and the pin's neck section 130B. The supporting pin's head section 130C is partially spear-shaped to permit the transparent disc to be easily placed over the supporting pin. The central axis of the supporting pin 130 is substantially offset from the central axis of the corresponding hole in the transparent disc which the pin engages, sufficiently so that it is necessary to apply a slight, evenly distributed pressure to the upper surface of the disc to fit it onto the pin. When the transparent disc is first placed onto the pin's head 130C, the pin will bend slightly. However, as pressure is applied to the upper surface of the disc and it slides down to the pin's neck section 130B, the tension on the pin is relieved and it straightens out. At that point, the disc snaps into the position illustrated in FIG. 7, which is parallel to the equilibrium position of the compass card's flat section.

Referring back to FIG. 6, the cylindrical hub 104 on the transparent disc has a conically hollow interior which provides a stop surface for the pin 103 extending vertically from the central hub 21'. As the compass card 16' tilts on shaft 78' the pin 103 contacts the interior surface of cylindrical hub 104, which limits tilting of the pin and tends to maintain the compass card in a horizontal position.

Although the invention has been described in a gimbal-mounted compass assembly, it can be used in any compass having a rotatable card. Also, the bearing lines 32A and 36A could be offset 30° or 60° from either side of course line 34A instead of 45°. Furthermore, while there have been described what are at present considered to be the preferred embodiments of the invention, it will be obvious to those skilled in the art that various changes and modifications may be made therein, without departing from the invention, and it is therefore intended to cover all such changes and modifications as fall within the true spirit and scope of the invention.

What is claimed is:

1. In a gimbal-mounted compass including a card rotatable about its center having directional markings and a gimbal cup for supporting said card, the improvement comprising a transparent member, means supporting said transparent member above said card, said supporting means including said gimbal cup, a first line inscribed on said transparent member extending radially from the center to the edge of said transparent member, a second line inscribed on said transparent member extending radially from the center to the edge of said transparent member, said second line forming an angle with said first line for referencing said directional markings and a damping fluid within the gimbal-mounted compass, said damping fluid and said transparent member having indices of refraction which are approximately equal.

2. The improvement recited in claim 1, in a compass as there specified, wherein said transparent member is a circular grid.

3. The improvement recited in claim 2, in a compass as there specified, wherein said grid has an outer circumferential rim, a central hub, and first and second radial arms extending from said hub to said rim upon which said first and second lines are respectively inscribed.

4. The improvement recited in claim 3, in a compass as there specified, wherein said supporting means comprises said gimbal cup.

5. The improvement recited in claim 4, in a compass as there specified, wherein said supporting means further comprises a shoulder depending downwardly from the underside of said outer rim which engages said gimbal cup.

6. The improvement recited in claim 5, in a compass as there specified, wherein said gimbal cup includes a ring-shaped section and said depending shoulder engages the top side of said ring-shaped section.

7. The improvement recited in claim 3, in a compass as there specified, wherein said hub is dome-shaped and has a central cavity.

8. The improvement recited in claim 3, in a compass as there specified, wherein said radial arms slope downwardly from said outer rim to said central hub.

9. The improvement recited in claim 3, in a compass as there specified, wherein said second radial arm is offset 45° from said first radial arm.

10. The improvement recited in claim 3 further comprising a third radial arm having a third line inscribed thereon wherein said third radial arm is offset one hundred eighty degrees from said first radial arm.

11. The improvement recited in claim 3, in a compass as there specified, wherein there is a cavity in said first radial arm and further comprising a lubber line extending vertically from said gimbal cup through the cavity in said first radial arm.

12. The improvement recited in claim 1, in a compass as there specified, wherein said supporting means comprise a plurality of pins which extend vertically from said gimbal cup to engage said transparent member.

13. In the compass specified in claim 12, the improvement there specified, and each of said pins comprising a main section which is mounted in said gimbal cup and a neck section which directly adjoins said main section and which has a diameter narrower than said main section.

14. In the compass specified in claim 12, the improvement there recited, and said transparent member having a series of holes which are positioned about the outer periphery of said transparent member.

15. In a gimbal-mounted compass including a card rotatable about its center having directional markings and a gimbal cup for supporting said card, the improvement comprising a transparent member, a first line inscribed on said transparent member extending radially from the center to the edge of said transparent member and a second line inscribed on said transparent member extending radially from the center to the edge of said transparent member forming an angle with said first line for referencing said directional markings, means supporting said transparent member above said card comprising a plurality of pins extending vertically from said gimbal cup to engage said transparent member, a plurality of holes being positioned about the periphery of said transparent member, the vertical axis of each of said supporting pins being substantially offset from the vertical axis through each of the holes about said member's outer periphery.

16. In a gimbal-mounted compass including a normally horizontal card having directional markings thereon which can rotate and tilt about its center, and a gimbal cup for supporting said card, the improvement comprising a transparent member, means supporting said transparent member above said card, said supporting means including said gimbal cup, a first line inscribed on said transparent member which extends radially from the center to the edge of said member and a second line inscribed on said member extending radially from the center to the edge of said member, said second line forming an angle with said first line for referencing said directional markings, means on said transparent member and on said card for dampening the tilting of said card, and a dampening fluid within the gimbal-mounted compass, said dampening fluid and said transparent member having indices of refraction which are approximately equal.

17. In a compass as specified in claim 16, the improvement there recited, and said dampening means comprising a pin extending vertically from the center of said card and a hub having a central cavity into which said pin extends whereby the engagement of said pin with the interior walls of the hub's central cavity tends to urge the tilting card to a horizontal position.

18. In a compass as specified in claim 17, the improvement there recited, and said transparent member being a disc and said hub having a conically shaped interior for engaging said pin.

19. The improvement recited in claim 12, in a compass as there specified, wherein said transparent member is a grid and said pin extends through said hub's central cavity.

20. In a compass including a rotatable compass card having directional markings thereon supported on a first member, the improvement comprising a circular transparent disc supported substantially parallel to said compass card, said disc having a plurality of holes about its periphery, and a plurality of pins mounted about the periphery of said first member for supporting said disc, each of said pins having means for maintaining said disc substantially parallel to said first member, the vertical axis of each of said supporting pins being substantially offset from the vertical axis through each of the holes about the periphery of said disc.

21. In a compass as specified in claim 20, the improvement there recited, and said maintaining means comprising a notched section on said pin for engaging a corresponding hole in said disc.

* * * * *